United States Patent
Hsu

(10) Patent No.: US 12,498,629 B2
(45) Date of Patent: Dec. 16, 2025

(54) WAVELENGTH CONVERSION DEVICE AND PROJECTION DEVICE

(71) Applicant: Coretronic Corporation, Hsin-Chu (TW)

(72) Inventor: Pei-Yu Hsu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 399 days.

(21) Appl. No.: 18/360,786

(22) Filed: Jul. 27, 2023

(65) Prior Publication Data
US 2024/0036452 A1  Feb. 1, 2024

(30) Foreign Application Priority Data
Aug. 1, 2022 (CN) .......................... 202210914513.8

(51) Int. Cl.
*G03B 21/20* (2006.01)
*G02B 26/00* (2006.01)

(52) U.S. Cl.
CPC .......... *G03B 21/204* (2013.01); *G02B 26/008* (2013.01)

(58) Field of Classification Search
CPC .............................. G03B 21/204; G02B 26/008
USPC .......................................................... 353/84
See application file for complete search history.

(56) References Cited

U.S. PATENT DOCUMENTS

| | | | | |
|---|---|---|---|---|
| 2020/0004118 A1* | 1/2020 | Hsu | ...................... | G02B 26/008 |
| 2021/0373423 A1* | 12/2021 | Hsu | ...................... | G03B 21/204 |
| 2021/0376198 A1* | 12/2021 | Tsai | ...................... | G02B 26/008 |
| 2024/0126067 A1* | 4/2024 | Hsu | ...................... | G03B 21/16 |

FOREIGN PATENT DOCUMENTS

| | | |
|---|---|---|
| TW | 200825613 | 6/2008 |
| TW | 202006456 | 2/2020 |

* cited by examiner

*Primary Examiner* — Magda Cruz
(74) *Attorney, Agent, or Firm* — JCIPRNET

(57) ABSTRACT

A wavelength conversion device includes a disk, a wavelength conversion material, a light-transmitting counterweight ring, a first adhesive layer and at least one counterweight member. The disk has a central axis and rotates around the central axis as the rotation axis. The wavelength conversion material is arranged on the outer edge of the upper surface of the disk. The light-transmitting counterweight ring is arranged on the upper surface of the disk. The first adhesive layer is arranged between the light-transmitting counterweight ring and the disk. At least one counterweight member is disposed on one side of the light-transmitting counterweight ring away from the disk. The at least one counterweight member includes a weight and a photocured component covering the weight, and at least part of the photocured component is located between the weight and the light-transmitting counterweight ring. A projection device is also provided.

20 Claims, 13 Drawing Sheets

WAVELENGTH CONVERSION DEVICE AND PROJECTION DEVICE

CROSS-REFERENCE TO RELATED APPLICATION

This application claims the priority benefit of China application serial no. 202210914513.8, filed on Aug. 1, 2022. The entirety of the above-mentioned patent application is hereby incorporated by reference herein and made a part of this specification.

BACKGROUND OF THE DISCLOSURE

Field of the Disclosure

The disclosure relates to an optical device and an electronic device, and more particularly, to a wavelength conversion device and a projection device.

Description of Related Art

A projection device is a display device configured to generate an image. The imaging principle of the projection device is to convert the illumination beam generated by the illumination system into an image beam through a light valve, and then the image beam is projected to a projection target (such as screens or walls) through a projection lens to form a projected image.

In the illumination system, the current cost-effective way to generate red and green light is to adopt a blue laser diode to emit an excitation beam to a phosphor wheel, and adopt the excitation beam to excite the phosphor powder of the phosphor wheel to generate excited light. Then, the desired red or green light is filtered through a filter element (color wheel) for use. In the known phosphor wheel, a metal ring needs to be arranged to the phosphor wheel, thereby optimizing the centroid position of the phosphor wheel to improve the dynamic balance of the phosphor wheel.

However, if the dynamic balance of the phosphor wheel is unbalanced, a metal sheet needs to be added on the metal ring to improve the dynamic balance, for example, a metal sheet is added into an adhesive to adjust the centroid position of the phosphor wheel. For the convenience of the process, the adopted adhesives are UV-curable adhesives. However, due to the metal sheet is opaque sheet, the UV-curable adhesive is cover by the metal sheet might not be able to receive a sufficient amount of UV light. Therefore, the UV-curable adhesive cannot be completely cured, and there is reliability issue in the adhesion between the metal sheet and the metal ring.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY OF THE DISCLOSURE

The disclosure provides a wavelength conversion device and a projection device, which may improve the curing effect and structural strength of the photocured component in the counterweight member.

Other objects and advantages of the disclosure can be further understood from the technical features disclosed in the disclosure.

In order to achieve one or part or all of the above purposes or other purposes, the disclosure provides a wavelength conversion device, including a disk, a wavelength conversion material, a light-transmitting counterweight ring, a first adhesive layer and at least one counterweight member. The disk has a central axis and rotates around the central axis as the rotation axis. The wavelength conversion material is arranged on the outer edge of the upper surface of the disk. The light-transmitting counterweight ring is arranged on the upper surface of the disk. The light-transmitting counterweight ring includes a ring body and an outer protrusion portion. The outer protrusion portion is arranged on the surface of the ring body away from the disk. The first adhesive layer is arranged between the light-transmitting counterweight ring and the disk. At least one counterweight member is disposed on one side of the light-transmitting counterweight ring away from the disk. The at least one counterweight member includes a weight and a photocured component covering the weight, and at least part of the photocured component is located between the weight and the light-transmitting counterweight ring.

In order to achieve one or part or all of the above purposes or other purposes, the disclosure further provides a projection device including an illumination system, at least one light valve and a projection lens. The illumination system is configured to provide an illumination beam. The illumination system includes a wavelength conversion device. The wavelength conversion device includes a disk, a wavelength conversion material, a light-transmitting counterweight ring, a first adhesive layer and at least one counterweight member. The disk has a central axis and rotates around the central axis as the rotation axis. The wavelength conversion material is arranged on the outer edge of the upper surface of the disk. The light-transmitting counterweight ring is arranged on the upper surface of the disk. The light-transmitting counterweight ring includes a ring body and an outer protrusion portion. The outer protrusion portion is arranged on the surface of the ring body away from the disk. The first adhesive layer is arranged between the light-transmitting counterweight ring and the disk. At least one counterweight member is disposed on one side of the light-transmitting counterweight ring away from the disk. The at least one counterweight member includes a weight and a photocured component covering the weight, and at least part of the photocured component is located between the weight and the light-transmitting counterweight ring. The at least one light valve is disposed on a transmission path of the illumination beam and configured to convert the illumination beam into an image beam. The projection lens is arranged on the transmission path of the image beam, and is configured for projecting the image beam out of the projection device.

Based on the above, the embodiments of the disclosure have at least one of the following advantages or effects. In the wavelength conversion device and the projection device of the disclosure, the light-transmitting counterweight ring is arranged on the disk, and at least one counterweight member is arranged on the light-transmitting counterweight ring. The light-transmitting counterweight ring is a light-transmitting structure, and the counterweight member includes a weight and a photocured component covering the weight. Therefore, compared with the structure of conventional wavelength conversion device, when a counterweight member is manufactured for the wavelength conversion device, the light-transmitting counterweight ring with light-transmitting properties and the reflection of the disk allow the curing beam to irradiate the photocurable material from the lateral side, the oblique side, and the lower side through increased optical paths. In this way, the curing effect and structural strength of the photocured component may be improved.

Other objectives, features and advantages of the disclosure will be further understood from the further technological features disclosed by the embodiments of the disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
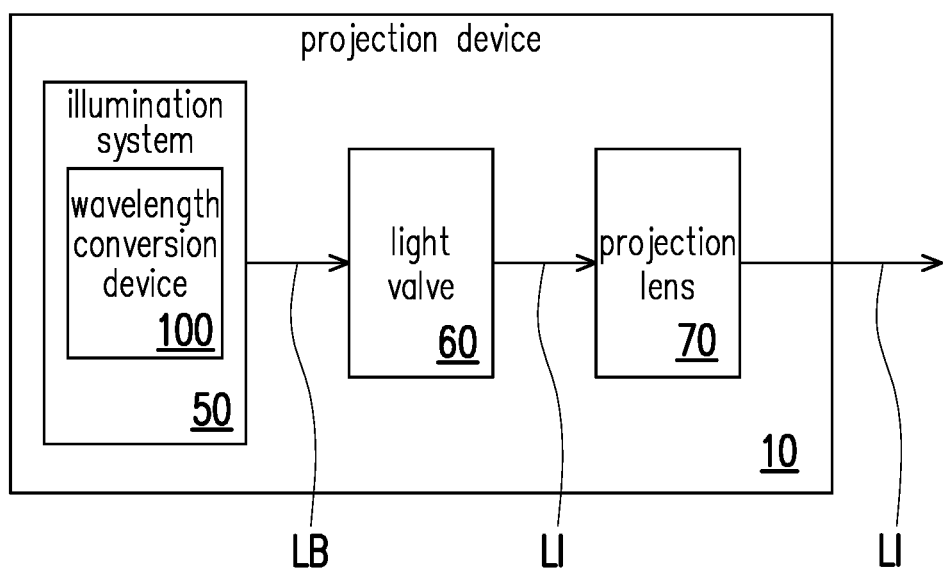
FIG. 1 is a schematic view of a projection device according to an embodiment of the disclosure.

FIG. 1 is a schematic view of a projection device according to an embodiment of the disclosure. Please refer to FIG. 1. The embodiment provides a projection device 10 including an illumination system 50, at least one light valve 60 and a projection lens 70. The illumination system 50 is configured to provide an illumination beam LB. The at least one light valve 60 is disposed on a transmission path of the illumination beam LB and configured to convert the illumination beam LB into an image beam LI. The projection lens 70 is disposed on the transmission path of the image beam LI, and is configured to project the image beam LI out of the projection device 10 to a projection target (not shown), such as a screen or a wall.

In this embodiment, the illumination system 50 includes, for example, multiple light-emitting elements, the wavelength conversion device 100, light homogenizing elements, filter elements, and multiple light splitting and combining elements to provide beams of different wavelengths, so as to form the illumination beam LB. The light-emitting elements are, for example, a light emitting diode (LED) or a laser diode (LD). However, the disclosure provides no limitation to the type or form of the illumination system 50 in the projection device 10.

The light valve 60 is, for example, a reflective light modulator such as a Liquid Crystal On Silicon panel (LCoS panel), a Digital Micro-mirror Device (DMD), and so on. In some embodiments, the light valve 60 may also be a transmissive light modulator such as a Transparent Liquid Crystal Panel, an Electro-Optical Modulator, a Magneto-Optic modulator, an Acousto-Optic Modulator (AOM). The disclosure provides no limitation to the type and form of the light valve 60. The detailed steps and implementation of the method for the light valve 60 to convert the illumination beam LB into the image beam LI may be obtained from the common knowledge in the technical field with sufficient teaching, suggestion and implementation, and therefore no further description is incorporated herein. In this embodiment, the number of light valves 60 is one, for example, the projection device 10 using one single DMD, but in other embodiments, there may be multiple light valves 60, and the disclosure is not limited thereto.

The projection lens 70 includes, for example, one or a combination of multiple optical lenses with refractive power, such as various combinations of non-planar lenses including biconcave lenses, biconvex lenses, concave-convex lenses, convex-concave lenses, plane-convex lenses, plane-concave lenses, etc. In an embodiment, the projection lens 70 may further include a reflective element to project the image beam LI from the optical valve 60 to the projection target. The disclosure does not limit the form and type of the projector lens 70.

Figure 2A:
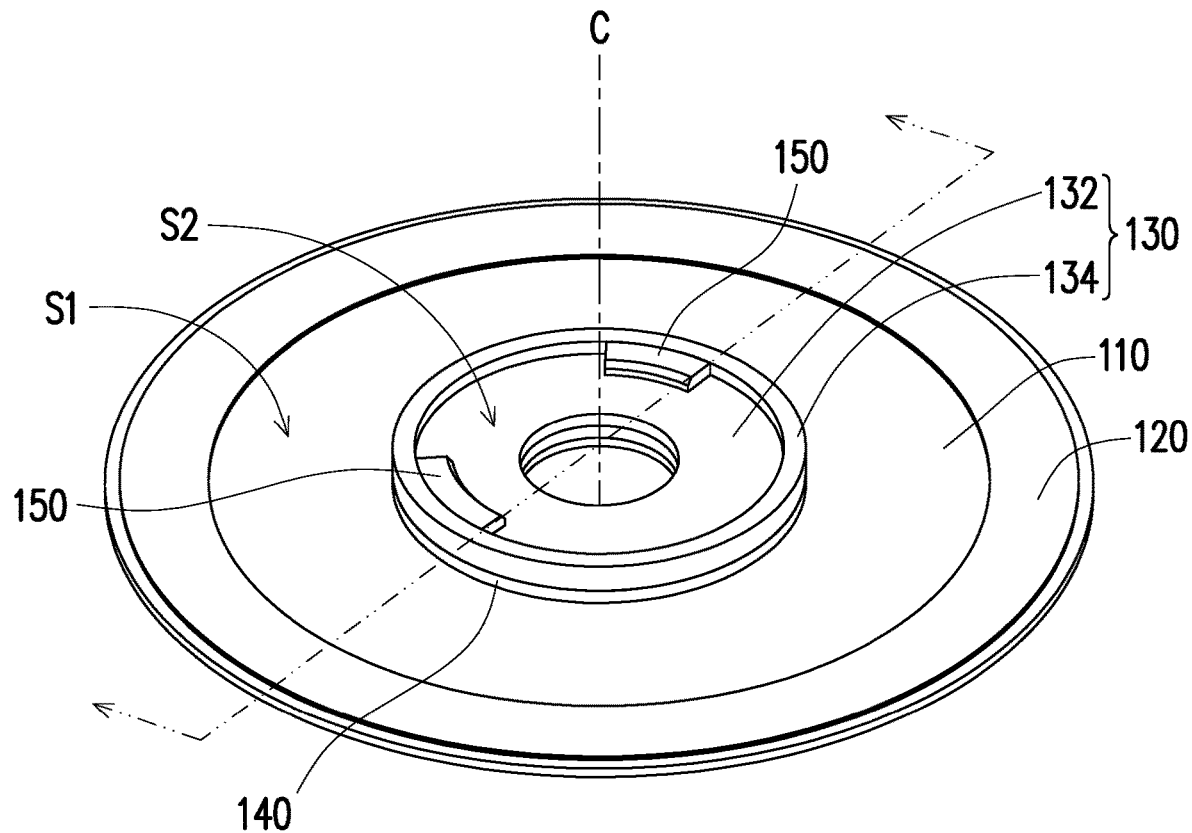
FIG. 2A is a schematic perspective view of a wavelength conversion device according to the first embodiment of the disclosure.
Figure 2B:
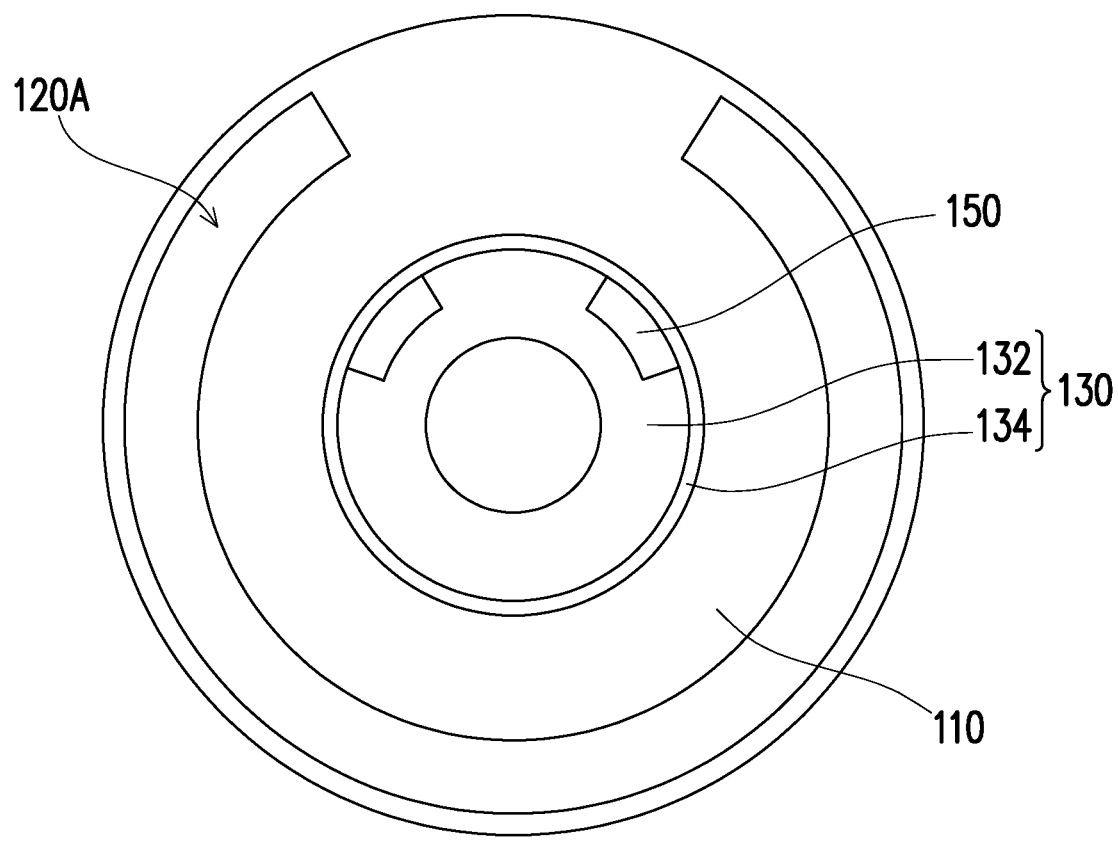
FIG. 2B is a schematic front view of a wavelength conversion device according to another embodiment of the disclosure.
Figure 3:
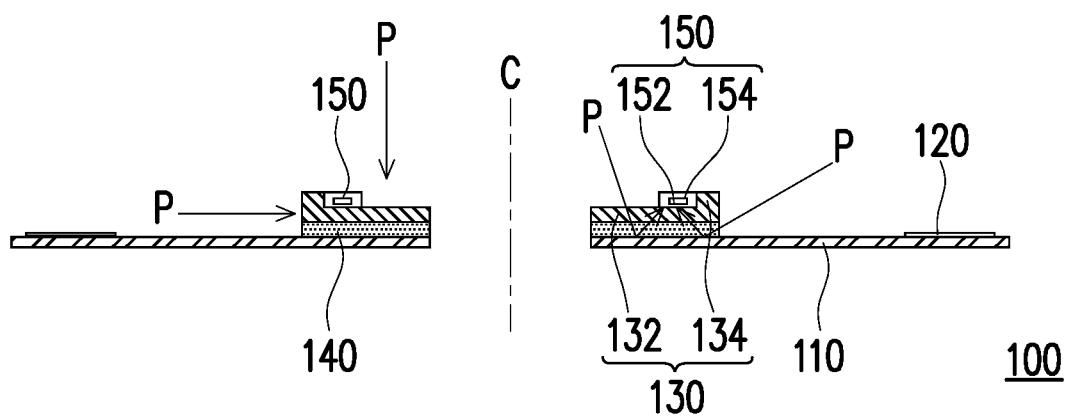
FIG. 3 is a schematic cross-sectional view of the wavelength conversion device according to the first embodiment of the disclosure.
Figure 4:
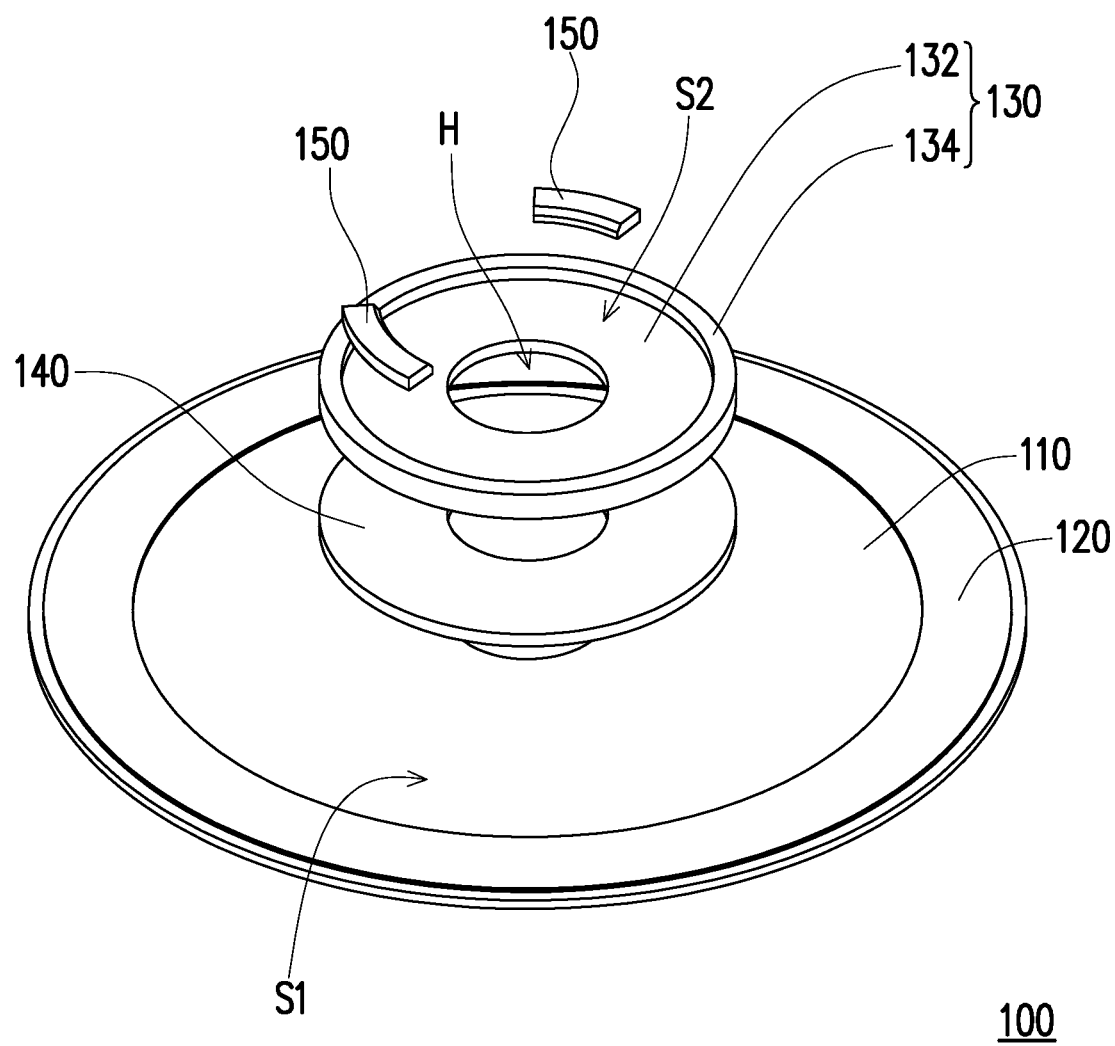
FIG. 4 is a perspective exploded view of the wavelength conversion device according to the first embodiment of the disclosure.

FIG. 2A is a schematic perspective view of a wavelength conversion device according to the first embodiment of the disclosure. FIG. 2B is a schematic front view of a wavelength conversion device according to another embodiment of the disclosure. FIG. 3 is a schematic cross-sectional view of the wavelength conversion device according to the first embodiment of the disclosure, for example, a schematic cross-sectional view with the broken line in FIG. 2A as the cross-sectional line. FIG. 4 is a perspective exploded view of the wavelength conversion device according to the first embodiment of the disclosure. Please refer to FIG. 2A to FIG. 4. The wavelength conversion device 100 of this embodiment may at least be applied to the illumination system 50 of the projection device 10 shown in FIG. 1, so the following description takes the application in the illumination system 50 of FIG. 1 as an example. The wavelength conversion device 100 is, for example, a phosphor wheel, for converting the excitation beam into excited beam of different wavelength, which is then provided as a part of the illumination beam LB.

In the first embodiment, the wavelength conversion device 100 includes a disk 110, a wavelength conversion material 120, a light-transmitting counterweight ring 130, a first adhesive layer 140, and at least one counterweight member 150. The disk 110 has a central axis C, and the disk 110 carries other components and rotates with the central axis C as a rotation axis. In this embodiment, the surface of the disk 110 has a high reflectivity. For example, the disk 110 is made of metal or coated with a reflective coating on the upper surface S1 of the disk 110. In other embodiments, the disk 110 may have an opening to allow the excitation beam to pass through, and a light-transmitting substrate may be optionally disposed in the opening. The wavelength conversion material 120 is disposed on the upper surface S1 of the disk 110 (e.g., the outer edge region of the upper surface S1, as shown in FIG. 2A). In this embodiment, the wavelength conversion material 120 may be an annular structure with a central angle of 360 degrees. In another embodiment, the wavelength conversion material 120A may be a partial annular structure with a central angle less than 360 degrees (i.e., a non-complete ring, as shown in FIG. 2B, the counterweight member 150 is, for example, closer to the notch of the wavelength conversion material 120A), but the disclosure is not limited thereto. In other embodiments, when the disk 110 has an opening, the wavelength conversion material 120 has a partial annular structure, and the notch of the partial annular structure is disposed corresponding to the region of the opening of the disk 110. In an embodiment, the wavelength conversion material 120 may include a first wavelength conversion material and a second wavelength conversion material, and the first wavelength conversion material and the second wavelength conversion material are disposed in different regions and connected to form an annular structure or a partial annular structure.

The light-transmitting counterweight ring 130 is disposed on the upper surface S1 of the disk 110, and does not overlap with the wavelength conversion material 120 in a direction parallel to the central axis C, that is, the projection range of the light-transmitting counterweight ring 130 on the upper surface S1 does not overlap with the projection range of the wavelength conversion material 120 on the upper surface S1. The wavelength conversion material 120 is disposed around the light-transmitting counterweight ring 130, for example. The light-transmitting counterweight ring 130 is adopted to carry at least one counterweight member 150 to correct the position of the center of gravity of the wavelength conversion device 100 (for example, the central axis C is located between the center of gravity of the at least one counterweight member 150 and the center of gravity of the wavelength conversion device 100 except for the at least one counterweight member 150). The light-transmitting counterweight ring 130 is a light-transmitting element and includes a ring body 132 and an outer protrusion portion 134. The ring body 132 is disc-shaped and has a through hole H, the central axis C passes through the through hole H, for example, and the outer protrusion portion 134 is disposed on the surface S2 of the ring body 132 away from the disk 110. In this embodiment, the components of the light-transmitting counterweight ring 130 are homogeneous materials, such as glass, ceramics, polymer materials, mixtures of polymer materials and solid fillers, or porous materials (e.g., foamed metal or porous ceramics, etc.), and the light transmittance is higher than 25%.

The first adhesive layer 140 is disposed between the light-transmitting counterweight ring 130 and the disk 110 for fixedly connecting the light-transmitting counterweight ring 130 and the disk 110. In this embodiment, the first adhesive layer 140 is made of a light-transmitting material, but the disclosure provides no limitation to the type of the first adhesive layer 140 and the material for making the same.

The at least one counterweight member 150 is disposed on one side (i.e., the surface S2) of the light-transmitting counterweight ring 130 away from the disk 110, for correcting the position of the center of gravity of the wavelength conversion device 100, for example, for correcting shift of center of gravity caused by coating the first adhesive layer 140, correcting shift of center of gravity caused by different wavelength conversion materials, or correcting shift of center of gravity caused by wavelength conversion materials that are not complete annular rings. The counterweight member 150 includes a weight 152 and a photocured component 154 covering the weight 152, and at least part of the photocured component 154 is located between the weight 152 and the light-transmitting counterweight ring 130 (e.g., the ring body 132), the photocured component 154 is formed by using a curing beam (e.g., UV light) to irradiate a photocurable material (e.g., photocurable resin) covering the weight 152. In other words, in this embodiment, the counterweight member 150 is formed by using the curing beam to irradiate the photocurable material. For example, in this embodiment, the number of the counterweight members 150 is two, but the disclosure is not limited thereto. The counterweight member 150, for example, connects the outer protrusion portion 134 of the light-transmitting counterweight ring 130 and the ring body 132.

Therefore, compared with the structure of conventional wavelength conversion device, when the counterweight member 150 is manufactured for the wavelength conversion device 100 of the embodiment, the light-transmitting counterweight ring 130 with light-transmitting properties and the reflection of the disk 110 (or the surface of the first adhesion layer 140) allow the curing beam to irradiate the photocurable material from the lateral side, the oblique side, and the lower side (optical path P, as shown in FIG. 3). In this way, the curing effect and structural strength of the photocured component 154 may be improved.

Figure 5:
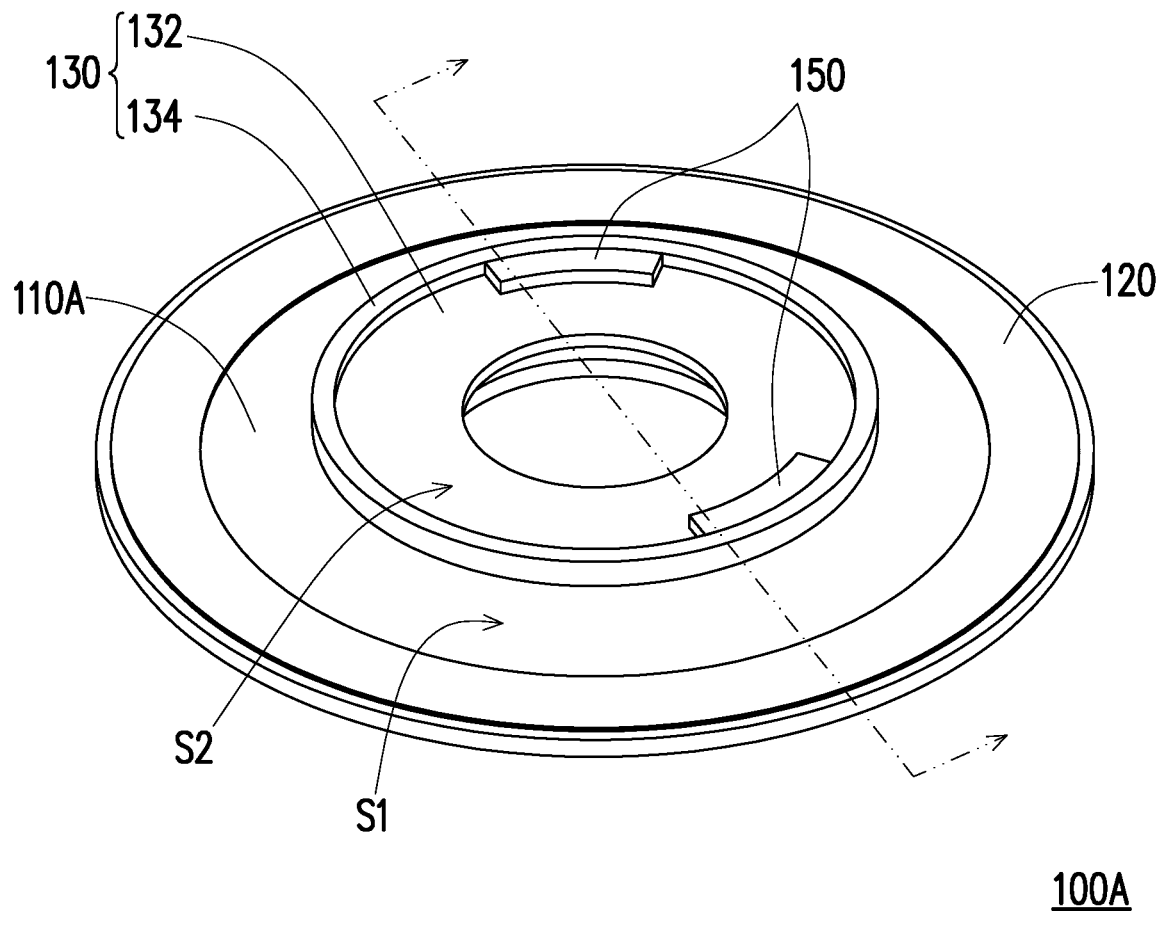
FIG. 5 is a schematic perspective view of a wavelength conversion device according to the second embodiment of the disclosure.
Figure 6A:
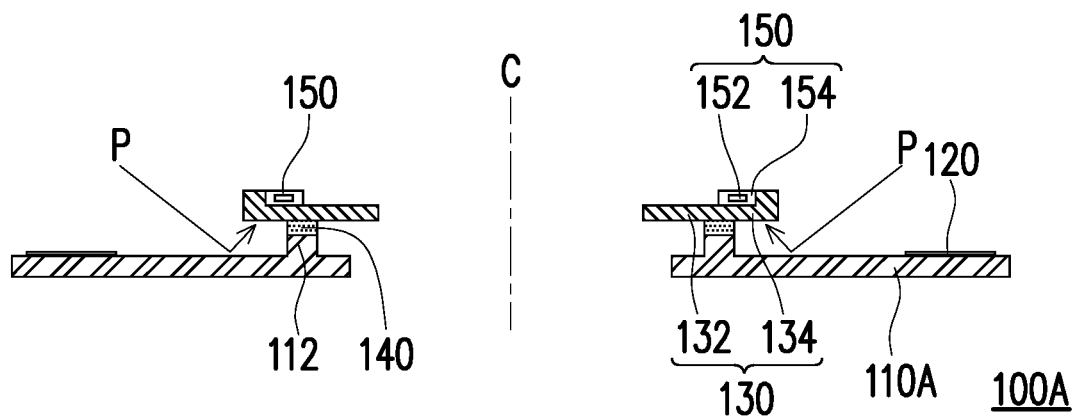
FIG. 6A is a schematic cross-sectional view of the wavelength conversion device according to the second embodiment of the disclosure.
Figure 6B:
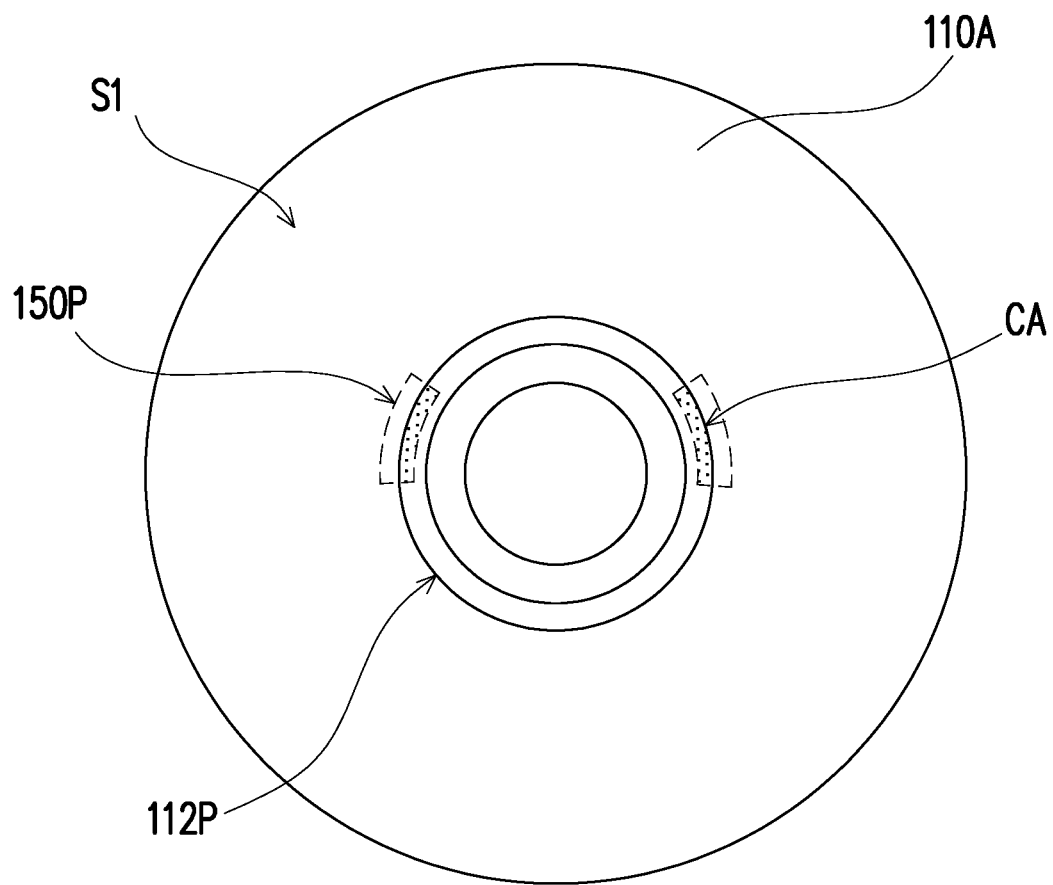
FIG. 6B is a schematic view of a projection region of an annular boss portion and a counterweight member according to the second embodiment of the disclosure.
Figure 7:
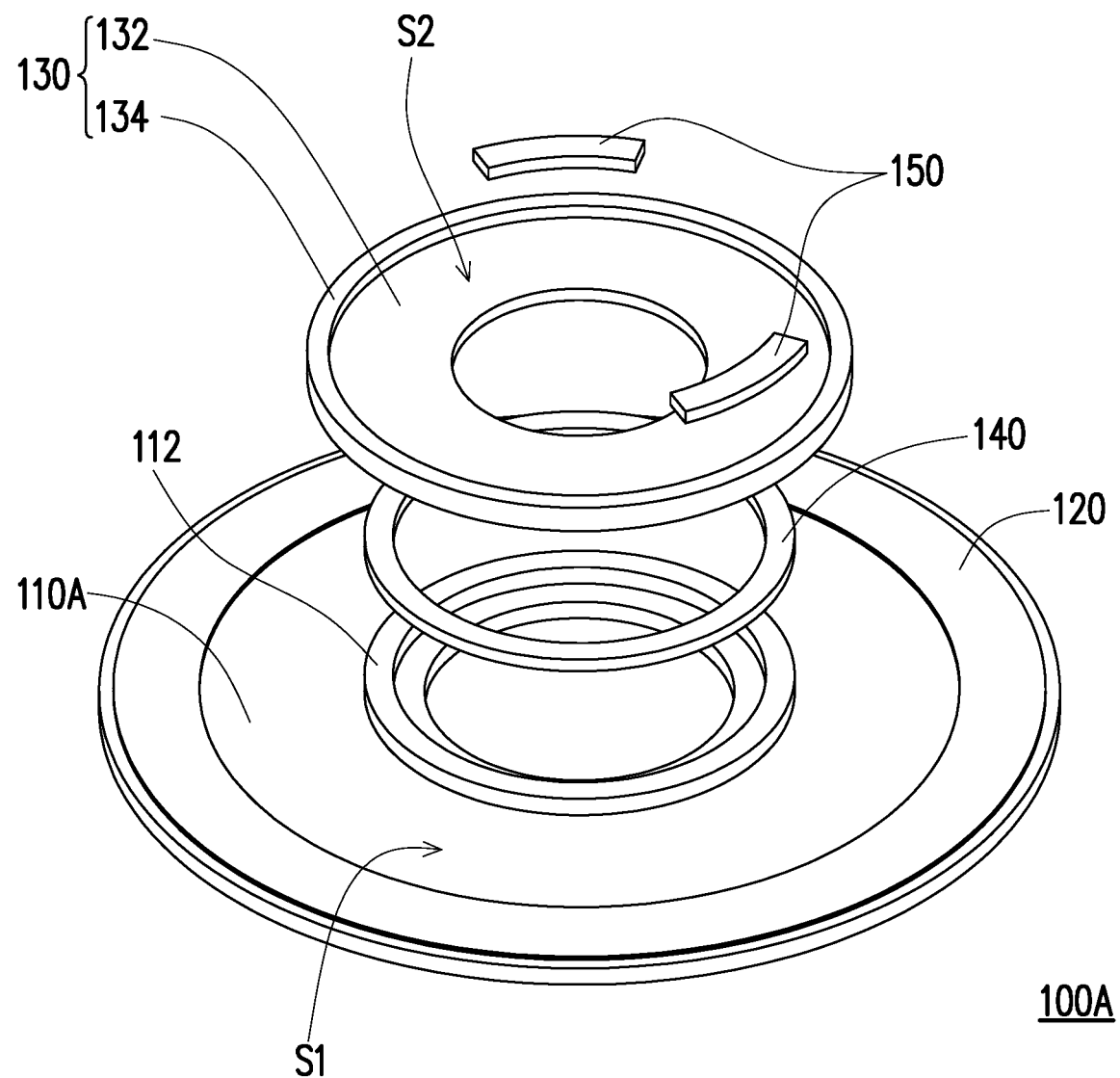
FIG. 7 is a perspective exploded view of the wavelength conversion device according to the second embodiment of the disclosure.

FIG. 5 is a schematic perspective view of a wavelength conversion device according to the second embodiment of the disclosure. FIG. 6A is a schematic cross-sectional view of the wavelength conversion device according to the second embodiment of the disclosure. FIG. 6B is a schematic view of a projection region of an annular boss portion and a counterweight member according to the second embodiment of the disclosure. FIG. 7 is a perspective exploded view of the wavelength conversion device according to the second embodiment of the disclosure. Please refer to FIG. 5 to FIG. 7. The wavelength conversion device 100A of the second embodiment is similar to the wavelength conversion device 100 of the first embodiment. The difference between the two is that, in this embodiment, the disk 110A further includes an annular boss portion 112 (as shown in FIG. 6A), and the center of symmetry of the annular boss portion 112 overlaps with the central axis C. The annular boss portion 112 is integrally formed with the surface of the disk 110A, for example, is formed by stamping, which may be a complete annular structure or a non-complete annular structure, and the disclosure is not limited thereto. In addition, the first adhesion layer 140 is connected between the light-transmitting counterweight ring 130 and the annular boss portion 112, and the outer diameter of the annular boss portion 112 is equal to the outer diameter of the first adhesive layer 140. The inner diameter of the annular boss portion 112 may optionally be equal to or smaller than the inner diameter of the first adhesive layer 140. In this embodiment, the annular boss portion 112 is adjacent to the inner edge (i.e., the through hole H) of the disk 110A, and the radius (or outer diameter) of the annular boss portion 112 is smaller than the radius (or outer diameter) of the light-transmitting counterweight ring 130. Therefore, a partial portion of the light-transmitting counterweight ring 130 is suspended from the disk 110A.

Specifically, in this embodiment, the first adhesive layer 140 is a light-transmitting material, and the surface of the annular boss portion 112 connected to the first adhesive layer 140 is a light-reflecting surface. In addition, the counterweight member 150 is connected to the outer protrusion portion 134 of the light-transmitting counterweight ring 130 and the ring body 132. An orthographic projection of the annular boss portion 112 on the upper surface S1 of the disk 110 has a first projection region 112P (see FIG. 6B), and an orthographic projection of the counterweight member 150 on the upper surface S1 of the disk 110 has a second projection region 150P. The area of the overlapping region CA (the dotted region shown in FIG. 6B) of the first projection region 112P and the second projection region 150P accounts for less than 70% of the second projection region 150P. In this way, when the counterweight member 150 is manufactured for the wavelength conversion device 100A of the embodiment, since a partial region of the light-transmitting counterweight ring 130 is suspended from the disk 110A, the curing beam may pass through the suspending area as the optical path P (as shown in FIG. 6A) to irradiate the photocurable material (photocured component 154) at the bottom of the counterweight member 150, thereby increasing the area of the counterweight member 150 being irradiated, so as to further improve the curing effect and structural strength of the photocured component 154.

Figure 8:
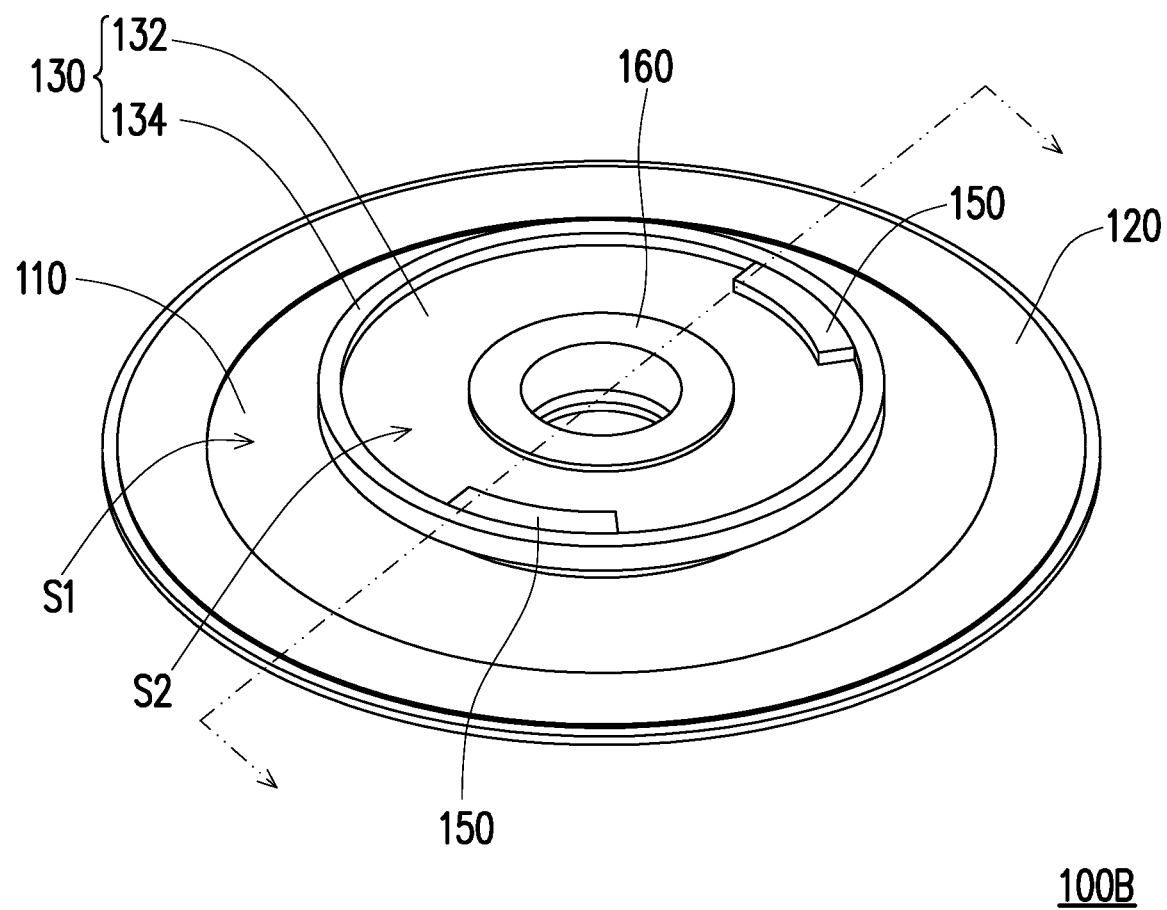
FIG. 8 is a schematic perspective view of a wavelength conversion device according to the third embodiment of the disclosure.
Figure 9:
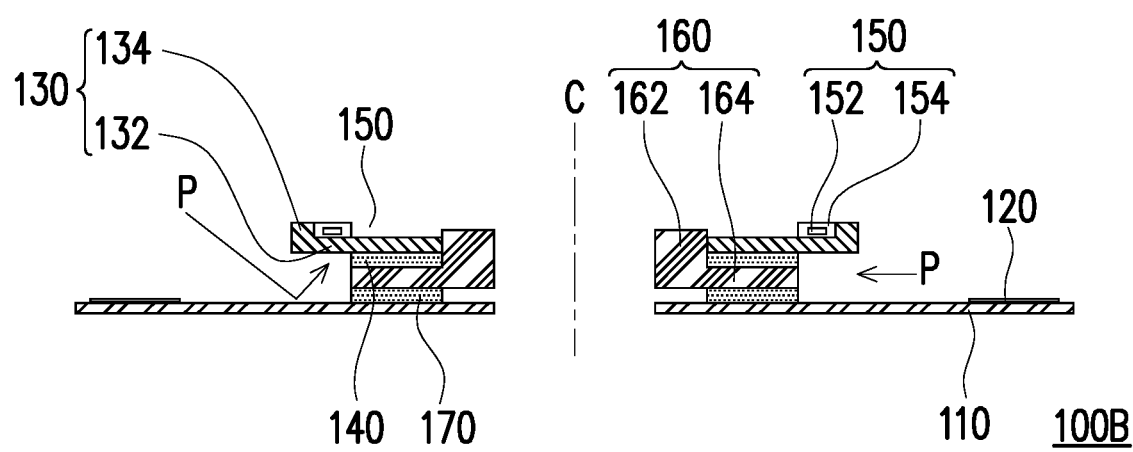
FIG. 9 is a schematic cross-sectional view of the wavelength conversion device according to the third embodiment of the disclosure.
Figure 10:
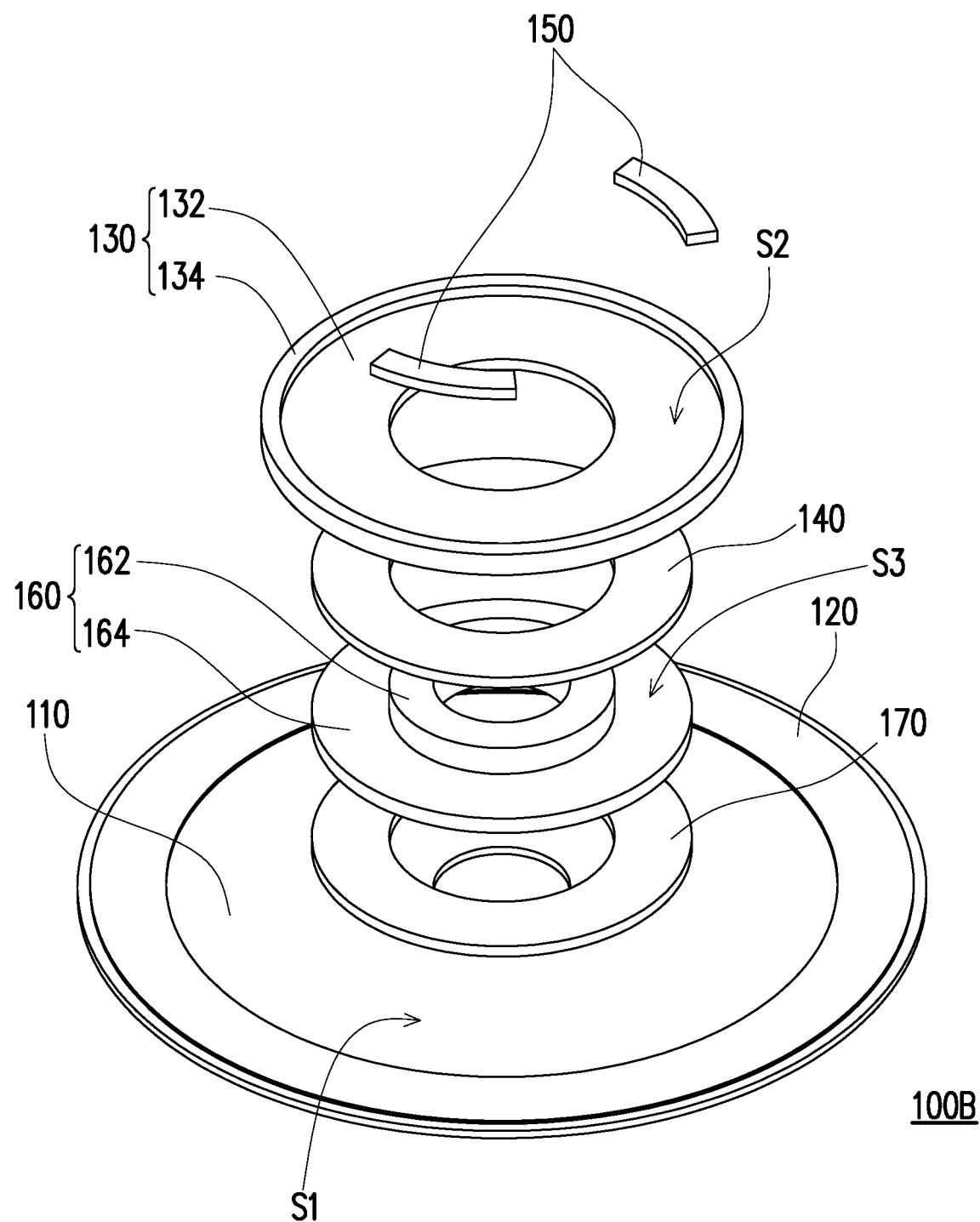
FIG. 10 is a perspective exploded view of the wavelength conversion device according to the third embodiment of the disclosure.

FIG. 8 is a schematic perspective view of a wavelength conversion device according to the third embodiment of the disclosure. FIG. 9 is a schematic cross-sectional view of the wavelength conversion device according to the third embodiment of the disclosure. FIG. 10 is a perspective exploded view of the wavelength conversion device according to the third embodiment of the disclosure. Please refer to FIG. 8 to FIG. 10. The wavelength conversion device 100B of the third embodiment is similar to the wavelength conversion device 100 of the first embodiment. The difference between the two is that, in this embodiment, the wavelength conversion device 100B further includes an annular boss member 160 and a second adhesive layer 170. The annular boss member 160 includes an annular inner protrusion portion 162 and an annular boss ring body 164. The annular inner protrusion portion 162 is disposed on the surface S3 of the annular boss ring body 164 away from the disk 110 (as shown in FIG. 10). The center of symmetry of the annular boss member 160 is overlapped with the central axis C. Specifically, the outer diameter of the annular inner protrusion portion 162 is smaller than the outer diameter of the annular boss ring body 164, and the first adhesive layer 140 is disposed between the annular boss ring body 164 and the light-transmitting counterweight ring 130. Therefore, the annular boss member 160 serves as a spacer structure to suspend the light-transmitting counterweight ring 130 from the disk 110, and the reliability of positioning is increased simultaneously. Similar to the annular boss portion 112 in the second embodiment, the annular inner protrusion portion 162 of this embodiment may be a complete annular structure or a non-complete annular structure, and the disclosure is not limited thereto. For example, the annular inner protrusion portion 162 may pass through the through hole H of the ring body 132, so that the structural stability of the wavelength conversion device 100B may be enhanced. The second adhesive layer 170 is disposed between the annular boss ring body 164 and the disk 110 for fixedly connecting the annular boss ring body 164 and the disk 110.

In this way, when the counterweight member 150 is manufactured for the wavelength conversion device 100B of the embodiment, since a partial region of the light-transmitting counterweight ring 130 is suspended from the disk 110, the curing beam may further pass through the suspending area as the optical path P (as shown in FIG. 9) to irradiate the photocurable material (photocured component 154) at the bottom of the counterweight member 150, thereby increasing the area of the counterweight member 150 being irradiated, so as to further enhance the curing effect and structural strength of the photocured component 154.

Figure 11:
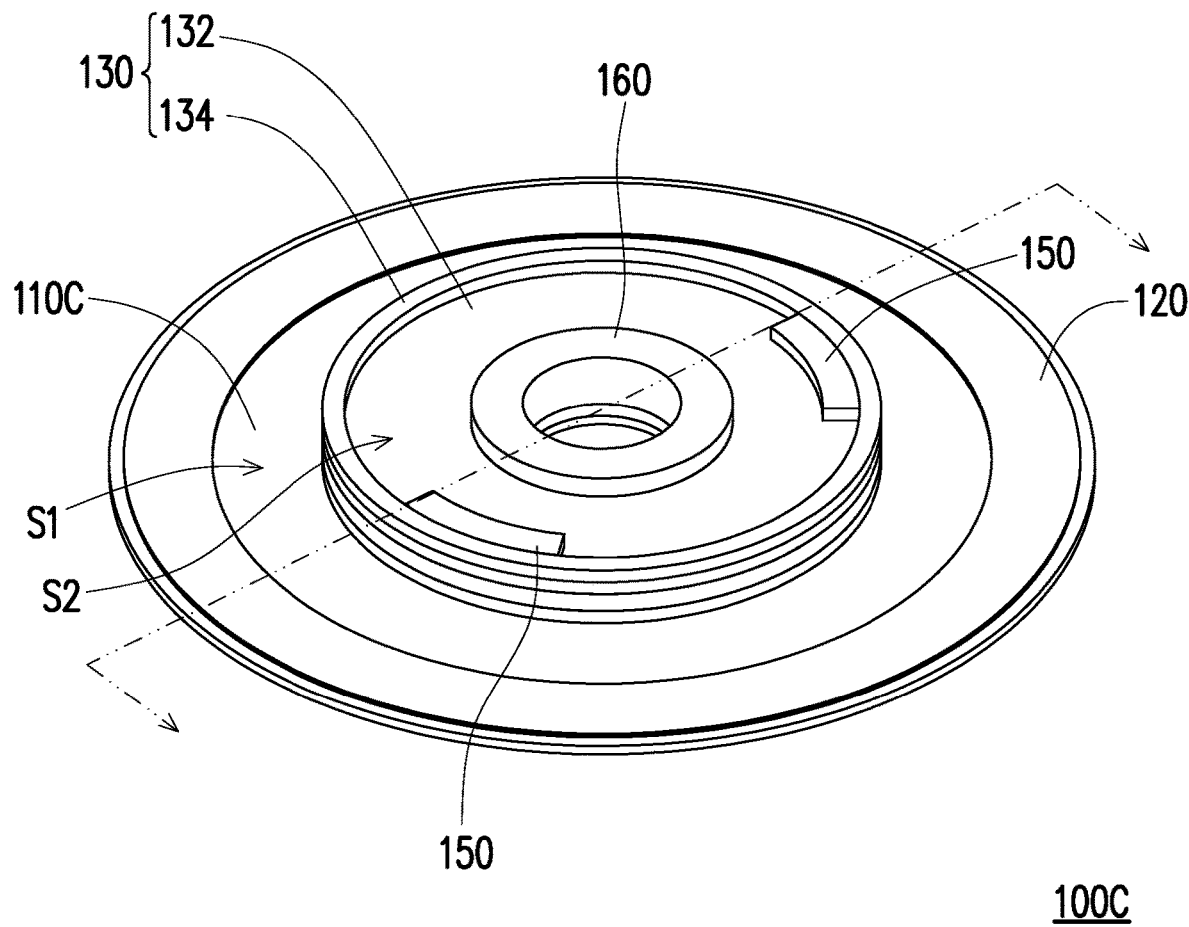
FIG. 11 is a schematic perspective view of the wavelength conversion device according to the fourth embodiment of the disclosure.
Figure 12:
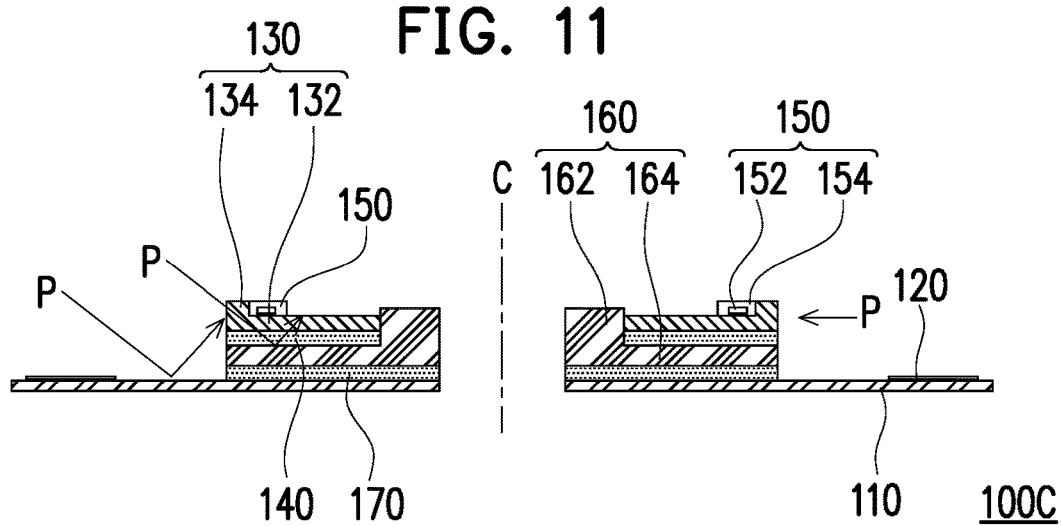
FIG. 12 is a schematic cross-sectional view of the wavelength conversion device according to the fourth embodiment of the disclosure.
Figure 13:
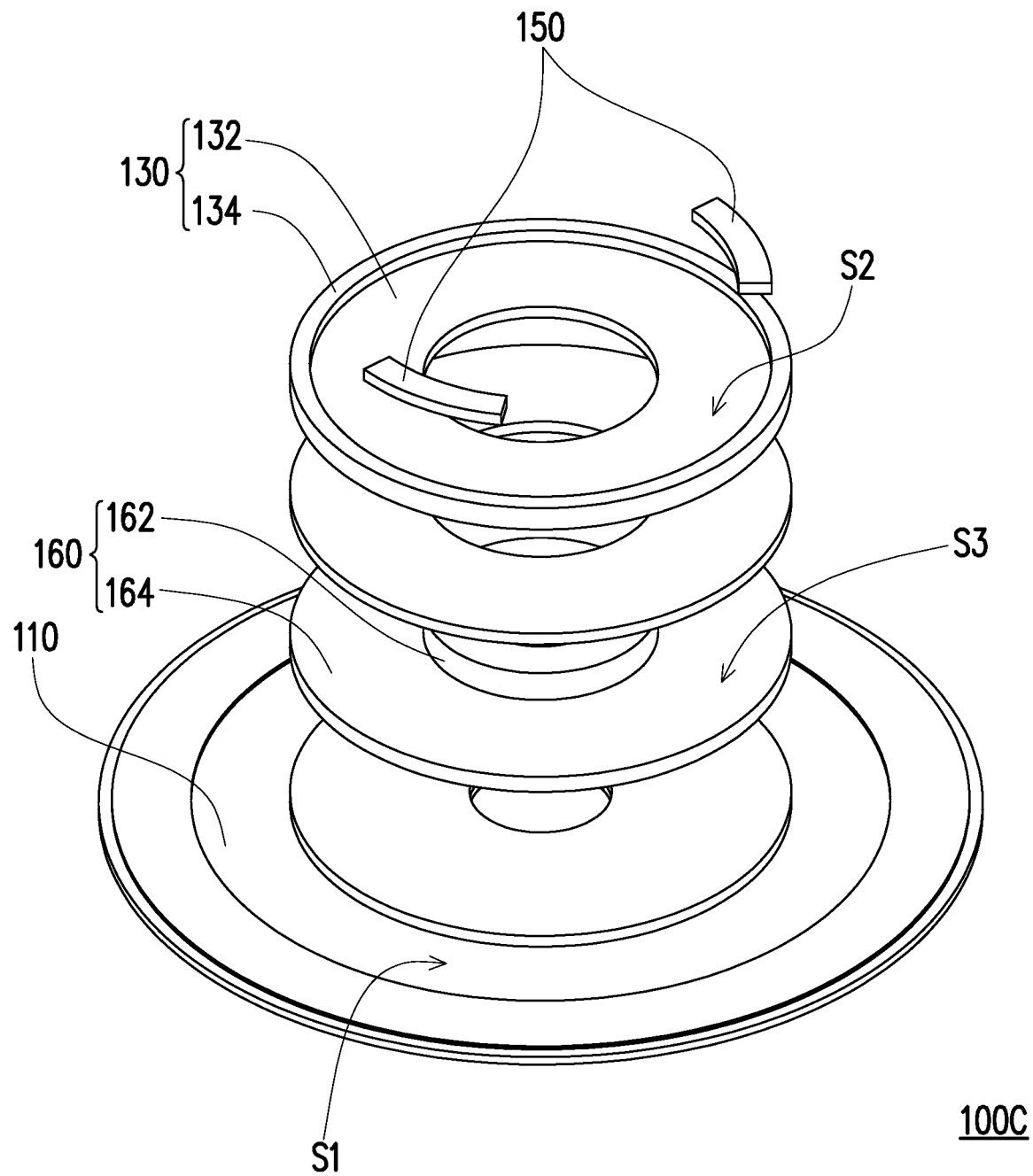
FIG. 13 is a perspective exploded view of the wavelength conversion device according to the fourth embodiment of the disclosure.

FIG. 11 is a schematic perspective view of the wavelength conversion device according to the fourth embodiment of the disclosure. FIG. 12 is a schematic cross-sectional view of the wavelength conversion device according to the fourth embodiment of the disclosure. FIG. 13 is a perspective exploded view of the wavelength conversion device according to the fourth embodiment of the disclosure. Please refer to FIG. 11 to FIG. 13. The wavelength conversion device 100C of the fourth embodiment is similar to the wavelength conversion device 100B of the third embodiment. The difference between the two is that, in the embodiment, the surface of the annular boss member 160 has high reflectivity properties. Therefore, in this embodiment, the annular boss ring body 164 of the annular boss member 160 may be adopted to reflect the curing beam. In this way, the light-transmitting counterweight ring 130 does not need to be suspended as in the third embodiment, the curing effect may be improved as long as there is an overlapping area between the annular boss ring body 164 and the light-transmitting counterweight ring 130. In this way, the curing effect and structural strength of the photocured component 154 may be further improved. In particular, the outer diameter of the annular boss ring body 164 may be equal to the outer diameter of the ring body 132, for example, so that the contact area of the first adhesive layer 140 and the second adhesive layer 170 with respect to the ring body 132, the annular boss ring body 164 and the disk 110 may be increased to improve the structural stability of the wavelength conversion device 100C.

Figure 14:
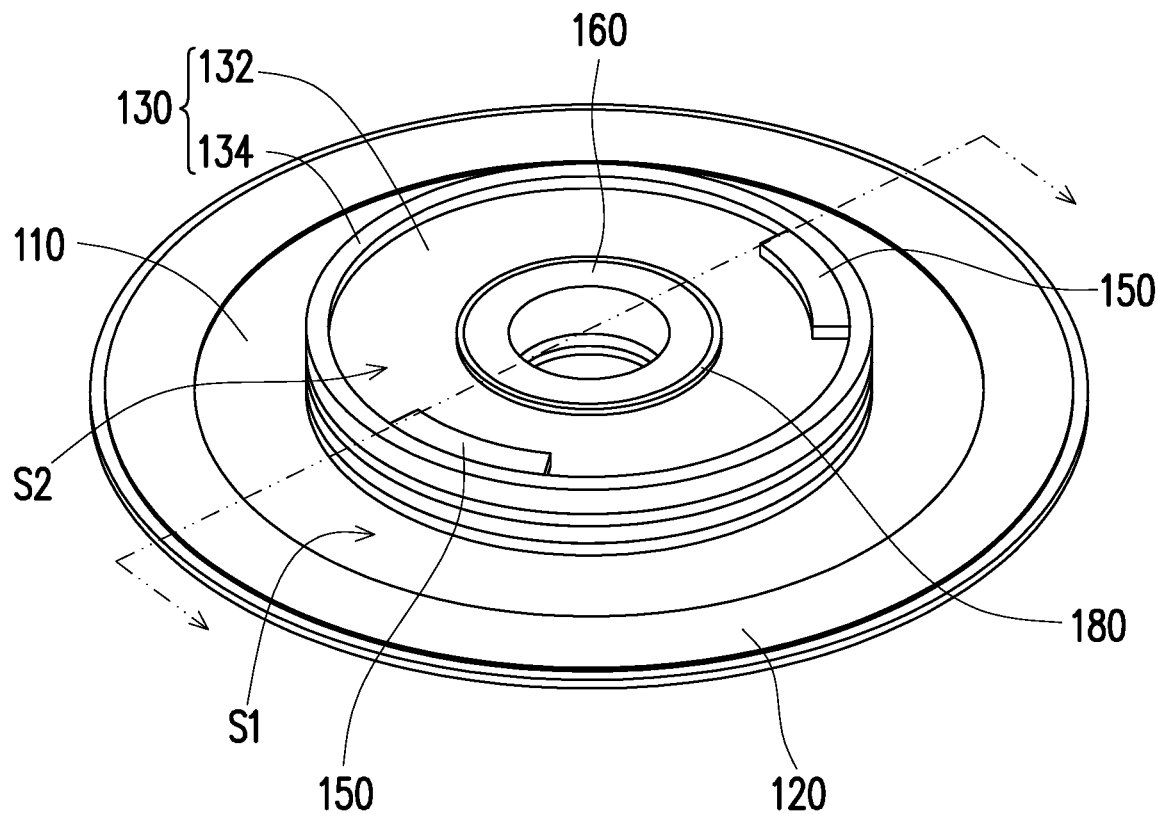
FIG. 14 is a schematic perspective view of a wavelength conversion device according to the fifth embodiment of the disclosure.
Figure 15:
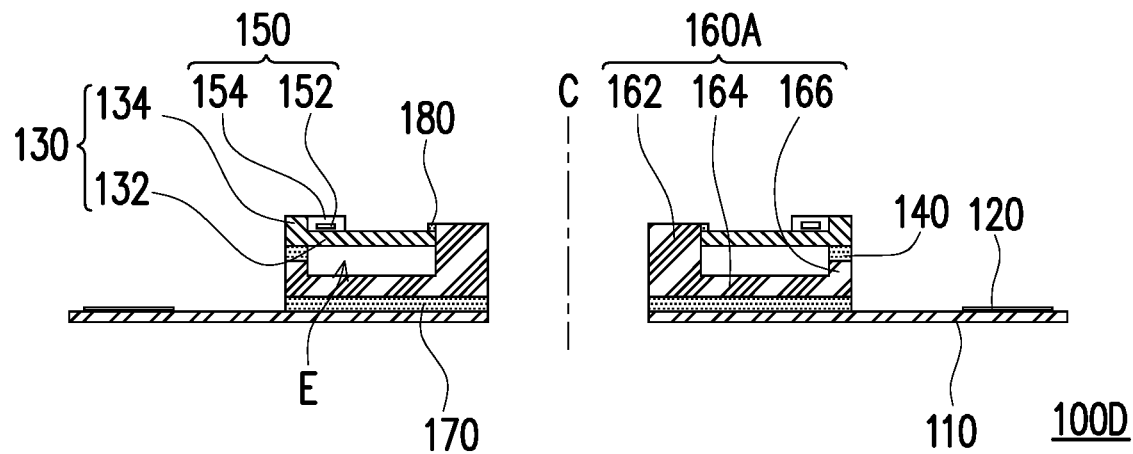
FIG. 15 is a schematic cross-sectional view of the wavelength conversion device according to the fifth embodiment of the disclosure.
Figure 16:
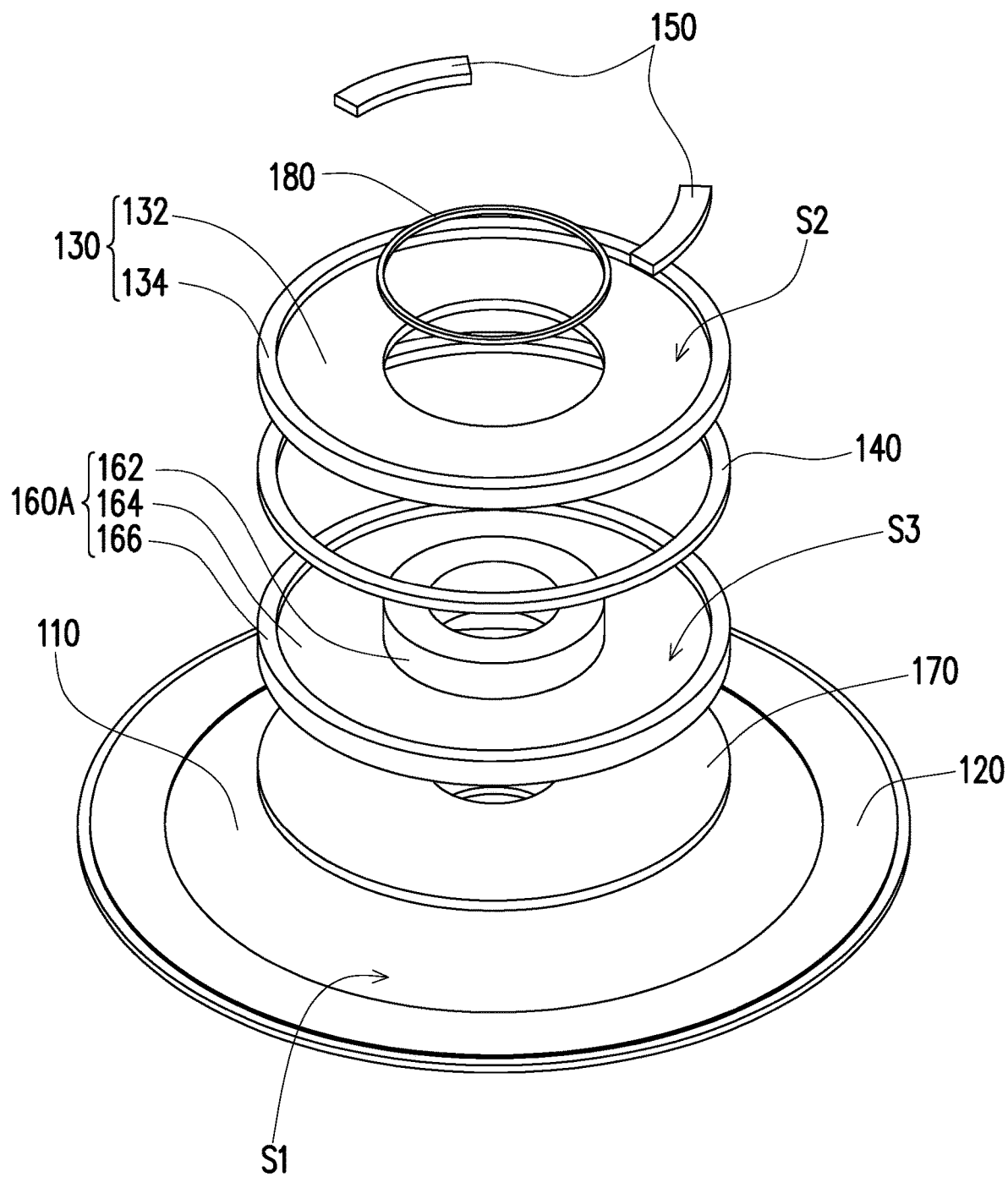
FIG. 16 is a perspective exploded view of the wavelength conversion device according to the fifth embodiment of the disclosure.

FIG. 14 is a schematic perspective view of a wavelength conversion device according to the fifth embodiment of the disclosure. FIG. 15 is a schematic cross-sectional view of the wavelength conversion device according to the fifth embodiment of the disclosure. FIG. 16 is a perspective exploded view of the wavelength conversion device according to the fifth embodiment of the disclosure. Please refer to FIG. 14 to FIG. 16. The wavelength conversion device 100D of the fifth embodiment is similar to the wavelength conversion device 100C of the fourth embodiment. The difference between the two is that, in this embodiment, the annular boss member 160A further includes an annular outer protrusion portion 166. The annular outer protrusion portion 166 and the annular inner protrusion portion 162 are disposed on the same surface (i.e., the surface S3) of the annular boss ring body 164. In this embodiment, the outer diameter of the annular outer protrusion portion 166 is equal to the outer diameter of the annular boss ring body 164. The first adhesive layer 140 is disposed between the annular outer protrusion portion 166 and the light-transmitting counterweight ring 130. The outer diameter of the annular outer protrusion portion 166 is equal to the outer diameter of the light-transmitting counterweight ring 130.

Specifically, in this embodiment, the annular outer protrusion portion 166 and the annular inner protrusion portion 162 respectively form an outer wall and an inner wall of the annular protrusion, and preferably, the annular inner protrusion portion 162 is higher than the annular outer protrusion portion 166. The light-transmitting counterweight ring 130 is disposed on the annular outer protrusion portion 166, and preferably, is connected with the annular outer protrusion portion 166 through a first adhesive 140. In this way, the light-transmitting counterweight ring 130, the annular inner protrusion portion 162, the annular outer protrusion portion 166, and the annular boss ring body 164 enclose a reflection cavity E of the curing beam. In a preferred embodiment, the surface (e.g., the surface S3) of the annular boss member 160A has diffuse reflection properties, so that the reflection cavity E is a diffuse reflection cavity. Also in a preferred embodiment, there is air in the reflection cavity E, but the disclosure is not limited thereto.

In this way, the embodiment may further enhance the curing effect and structural strength of the photocured component 154. In addition, in this embodiment, the wavelength conversion device 100D further includes a third adhesive layer 180 disposed on the ring body 132 (e.g., surface S2) of the light-transmitting counterweight ring 130 and connected to the annular inner protrusion portion 162. The light-transmitting counterweight ring 130 is located between the first adhesive layer 140 and the third adhesive layer 180. In this way, the structural strength of the wavelength conversion device 100D may be further increased.

To sum up, in the wavelength conversion device and the projection device of the disclosure, the light-transmitting counterweight ring is arranged on the disk, and at least one counterweight member is arranged on the light-transmitting counterweight ring. The light-transmitting counterweight ring is a light-transmitting structure, and the counterweight member includes a weight and a photocured component covering the weight. Therefore, compared with the structure of conventional wavelength conversion device, when the counterweight member is manufactured for the wavelength conversion device, the light-transmitting counterweight ring with light-transmitting properties and the reflection of the disk allow the curing beam to irradiate the photocurable material from the lateral side, the oblique side, and the lower side through increased optical paths. In this way, the curing effect and structural strength of the photocured component may be improved.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the disclosure is intended to be dedicated to the public regardless of whether the element or component is explicitly recited in the following claims.

What is claimed is:

1. A wavelength conversion device, comprising:
a disk, having a central axis and rotating around the central axis as a rotation axis;
a wavelength conversion material, disposed on an outer edge of an upper surface of the disk;
a light-transmitting counterweight ring, disposed on the upper surface of the disk, wherein the light-transmitting counterweight ring is a light-transmitting structure and comprises a ring body and an outer protrusion portion, the outer protrusion portion is disposed on a surface of the ring body away from the disk;
a first adhesive layer, disposed between the light-transmitting counterweight ring and the disk; and
at least one counterweight member, disposed on one side of the light-transmitting counterweight ring away from the disk, the at least one counterweight member comprises a weight and a photocured component covering the weight, wherein at least a part of the photocured component is located between the weight and the light-transmitting counterweight ring.

2. The wavelength conversion device according to claim 1, wherein components of the light-transmitting counterweight ring comprise glass, ceramics, polymer materials, mixtures of the polymer materials and solid fillers, or porous materials, and a light transmittance is higher than 25%.

3. The wavelength conversion device according to claim 1, wherein the first adhesive layer is made of a light-transmitting material.

4. The wavelength conversion device according to claim 1, wherein the disk comprises an annular boss portion, and the first adhesive layer is connected between the light-transmitting counterweight ring and the annular boss portion, and an outer diameter of the annular boss portion is the same as an outer diameter of the first adhesive layer.

5. The wavelength conversion device according to claim 4, wherein a radius of the annular boss portion is smaller than a radius of the light-transmitting counterweight ring.

6. The wavelength conversion device according to claim 5, wherein the at least one counterweight member is connected to the outer protrusion portion of the light-transmitting counterweight ring and the ring body, an orthographic projection of the annular boss portion on the upper surface of the disk has a first projection region, and an orthographic projection of the at least one counterweight member on the upper surface of the disk has a second projection region, an area of an overlapping region of the first projection region and the second projection region accounts for less than 70% of the second projection region.

7. The wavelength conversion device according to claim 4, wherein the first adhesive layer is made of a light-transmitting material, and a surface of the annular boss portion connected to the first adhesive layer is a light-reflecting surface.

8. The wavelength conversion device according to claim 1, further comprising:
an annular boss member, comprising an annular inner protrusion portion and an annular boss ring body, wherein the annular inner protrusion portion is disposed on a surface of the annular boss ring body away from the disk, an outer diameter of the annular inner protrusion portion is smaller than an outer diameter of the annular boss ring body, and the first adhesive layer is disposed between the annular boss ring body and the light-transmitting counterweight ring; and
a second adhesive layer, disposed between the annular boss member and the disk.

9. The wavelength conversion device according to claim 8, wherein the annular boss member further comprises an annular outer protrusion portion, the annular outer protrusion portion and the annular inner protrusion portion are disposed on a same surface of the annular boss ring body, an outer diameter of the annular outer protrusion portion is equal to the outer diameter of the annular boss ring body, the first adhesive layer is disposed between the annular outer protrusion portion and the light-transmitting counterweight ring, and the outer diameter of the annular outer protrusion portion is equal to an outer diameter of the light-transmitting counterweight ring.

10. The wavelength conversion device according to claim 9, further comprising:
a third adhesive layer, disposed on the ring body of the light-transmitting counterweight ring and connected to the annular inner protrusion portion, the light-transmitting counterweight ring is located between the first adhesive layer and the third adhesive layer.

11. A projection device, comprising:
an illumination system, configured to provide an illumination beam, wherein the illumination system comprises a wavelength conversion device, and the wavelength conversion device comprising:
a disk, having a central axis and rotating around the central axis as a rotation axis;
a wavelength conversion material, disposed on an outer edge of an upper surface of the disk;
a light-transmitting counterweight ring, disposed on the upper surface of the disk, wherein the light-transmitting counterweight ring comprises a ring body and an outer protrusion portion, the outer protrusion portion is disposed on a surface of the ring body away from the disk;
a first adhesive layer, disposed between the light-transmitting counterweight ring and the disk; and
at least one counterweight member, disposed on one side of the light-transmitting counterweight ring away from the disk, the at least one counterweight member comprises a weight and a photocured component covering the weight, wherein at least a part of the photocured component is located between the weight and the light-transmitting counterweight ring;
at least one light valve, disposed on a transmission path of the illumination beam, and configured to convert the illumination beam into an image beam; and
a projection lens, disposed on a transmission path of the image beam, and configured to project the image beam out of the projection device.

12. The projection device according to claim 11, wherein components of the light-transmitting counterweight ring comprise glass, ceramics, polymer materials, mixtures of the polymer materials and solid fillers, or porous materials, and a light transmittance is higher than 25%.

13. The projection device according to claim 11, wherein the first adhesive layer is made of a light-transmitting material.

14. The projection device according to claim 11, wherein the disk comprises an annular boss portion, and the first adhesive layer is connected between the light-transmitting counterweight ring and the annular boss portion, and an outer diameter of the annular boss portion is the same as an outer diameter of the first adhesive layer.

15. The projection device according to claim 14, wherein the first adhesive layer is made of a light-transmitting material, and a surface of the annular boss portion connected to the first adhesive layer is a light-reflecting surface.

16. The projection device according to claim 11, wherein a radius of the annular boss portion is smaller than a radius of the light-transmitting counterweight ring.

17. The projection device according to claim 11, wherein the at least one counterweight member is connected to the outer protrusion portion of the light-transmitting counterweight ring and the ring body, an orthographic projection of the annular boss portion on the upper surface of the disk has a first projection region, and an orthographic projection of the at least one counterweight member on the upper surface of the disk has a second projection region, an area of an overlapping region of the first projection region and the second projection region accounts for less than 70% of the second projection region.

18. The projection device according to claim 11, wherein the wavelength conversion device further comprises an annular boss member and a second adhesive layer, the annular boss member comprises an annular inner protrusion portion and an annular boss ring body, the annular inner protrusion portion is disposed on a surface of the annular boss ring body away from the disk, an outer diameter of the annular inner protrusion portion is smaller than an outer diameter of the annular boss ring body, and the first adhesive layer is disposed between the annular boss ring body and the light-transmitting counterweight ring, and the second adhesive layer is disposed between the annular boss member and the disk.

19. The projection device according to claim 18, wherein the annular boss member further comprises an annular outer protrusion portion, the annular outer protrusion portion and the annular inner protrusion portion are disposed on a same surface of the annular boss ring body, an outer diameter of the annular outer protrusion portion is equal to the outer diameter of the annular boss ring body, the first adhesive layer is disposed between the annular outer protrusion portion and the light-transmitting counterweight ring, and the outer diameter of the annular outer protrusion portion is equal to an outer diameter of the light-transmitting counterweight ring.

20. The projection device according to claim 19, wherein the wavelength conversion device further comprises a third adhesive layer, disposed on the ring body of the light-transmitting counterweight ring and connected to the annular inner protrusion portion, the light-transmitting counterweight ring is located between the first adhesive layer and the third adhesive layer.

\* \* \* \* \*